United States Patent
Sterne et al.

[19]

[11] Patent Number: 5,818,839
[45] Date of Patent: Oct. 6, 1998

[54] TIMING REFERENCE FOR SCHEDULING DATA TRAFFIC ON MULTIPLE PORTS

[75] Inventors: Jason T. Sterne, Ottawa; David W. Carr; Joey M. W. Chow, both of Nepean, all of Canada

[73] Assignee: Newbridge Networks Corporation, Kanata, Canada

[21] Appl. No.: 884,625

[22] Filed: Jun. 27, 1997

[51] Int. Cl.[6] .................................................. H04L 12/56
[52] U.S. Cl. ............................................ 370/391; 370/418
[58] Field of Search .................................... 370/468, 543, 370/412, 414, 416, 418, 230, 235, 391, 417, 395

[56] References Cited

U.S. PATENT DOCUMENTS

| | | | |
|---|---|---|---|
| 3,665,405 | 5/1972 | Sanders et al. | 370/538 |
| 5,280,475 | 1/1994 | Yanagi et al. | 370/395 |
| 5,416,434 | 5/1995 | Kootstra et al. | 327/113 |
| 5,500,858 | 3/1996 | McKeown | 370/412 |
| 5,535,201 | 7/1996 | Zheng | 370/231 |
| 5,640,389 | 6/1997 | Masaki et al. | 370/418 |
| 5,719,865 | 2/1998 | Sato | 370/395 |
| 5,734,650 | 3/1998 | Hayter et al. | 370/391 |
| 5,745,477 | 4/1998 | Zheng et al. | 370/230 |

*Primary Examiner*—Chau Nguyen
*Assistant Examiner*—Kenneth Vanderpuye
*Attorney, Agent, or Firm*—Marks & Clerk

[57] ABSTRACT

Data traffic such as cell streams in an ATM communication network frequently contain data destined for multiple output ports having different transmission data rates. In order to accurately schedule such traffic a clocking signal unique to each output data rate is required. This invention provides systems and methods for generating the necessary clock signals utilizing a single timing reference.

12 Claims, 2 Drawing Sheets

TIMING REFERENCE FOR SCHEDULING DATA TRAFFIC ON MULTIPLE PORTS

FIELD OF THE INVENTION

The present invention relates to the scheduling of data traffic to multiple output ports having different data rates and more particularly to the scheduling of such traffic utilizing a single timing reference.

BACKGROUND

The present invention will be described with reference to data traffic management in an asynchronous transfer mode (ATM) network for broadband communications but it is to be understood that the basic concept disclosed is applicable to any data traffic management device which services multiple output ports having different data transmission rates.

Asynchronous transfer mode (ATM) is a networking technology that provides broadband communications and differentiated qualities of service (QoS). The technology, which utilizes a fixed length cell, is well-suited to the transmission of voice, video and data utilizing both real-time and non-real-time service categories. Statistical multiplexing is used in ATM switches to allow for a high efficiency of resource utilization. In order to take advantage of the statistical nature of ATM traffic and still ensure some guaranteed QoS to network data it is important that the streams of ATM data conform to certain specific parameters. These parameters and the guaranteed qualities of service make up the traffic contract as established by the ATM Traffic Management Forum.

In ATM switches it is often useful and/or necessary to shape or schedule ATM cells from various traffic streams. This scheduling ensures that the traffic conforms to the specified parameters for each particular stream which leads to better overall network performance. There are applications where a shaping entity in an ATM system needs to schedule a mixture of traffic which is bound for several output ports. Each of these output ports may have a different data rate parameter. The requirement to service multiple data streams to output ports having different data rates requires or at least implies that the scheduling entity must adopt a different timing reference for each output port.

SUMMARY OF THE INVENTION

It is an object of the present invention to provide systems and methods for scheduling data traffic onto several ports with each port having a different data rate using only a single timing reference as an input to the traffic scheduling device.

In a specific embodiment of the invention the systems and methods apply to an ATM communication network.

Therefore, in accordance with a first aspect of the present invention, there is provided in a data traffic management system having a plurality of output ports for servicing data traffic of different data rates and a scheduling device having a plurality of data calendars for shaping data traffic destined for each of said output ports, a single timing reference to schedule transmission of data to appropriate output ports. The single timing reference comprises timing means to generate a clock pulse based on the data rate of the output port having the fastest data rate; counter means to continually count the clock pulses following an initialization event; increment means to dynamically compare the accumulated number of clock pulses with predetermined increments for each calendar based on the data rate assigned thereto; and threshold means responsive to inputs from said increment means to control transmission of data traffic from each of said calendars.

In a first embodiment the clock pulse is equal to the data rate of the data traffic of the output port having the fastest data rate.

In this embodiment a first-in, first-out buffer is positioned in advance of the output port to absorb the bursty nature of the calendar output.

In accordance with a second embodiment the clock pulse is 'n' times faster than the data rate of the output port having the fastest data rate. It is anticipated that 'n' will be at least 10.

In accordance with a second aspect of the present invention there is provided a method of providing a timing reference to a data traffic management system, the system having a plurality of output ports each configured to transmit data at a different data rate and a scheduling device having a calendar for shaping data traffic for delivery to each of said output ports. The method comprises the steps of continually generating a clock pulse based on the data rate of the output port having the fastest data rate; counting the accumulated clock pulses following an initialization event; dynamically comparing the accumulated clock pulses with predetermined increment values for each calendar based on an assigned data rate for each calendar; and controlling transmission of data from the calendars from appropriate output ports in response to input signals generated by threshold means when the accumulated clock pulses and increment values reach a threshold respecting each calendar.

DESCRIPTION OF THE DRAWINGS

The invention will now be described in greater detail with reference to the attached drawings wherein.

DETAILED DESCRIPTION OF THE INVENTION

Figure 1:
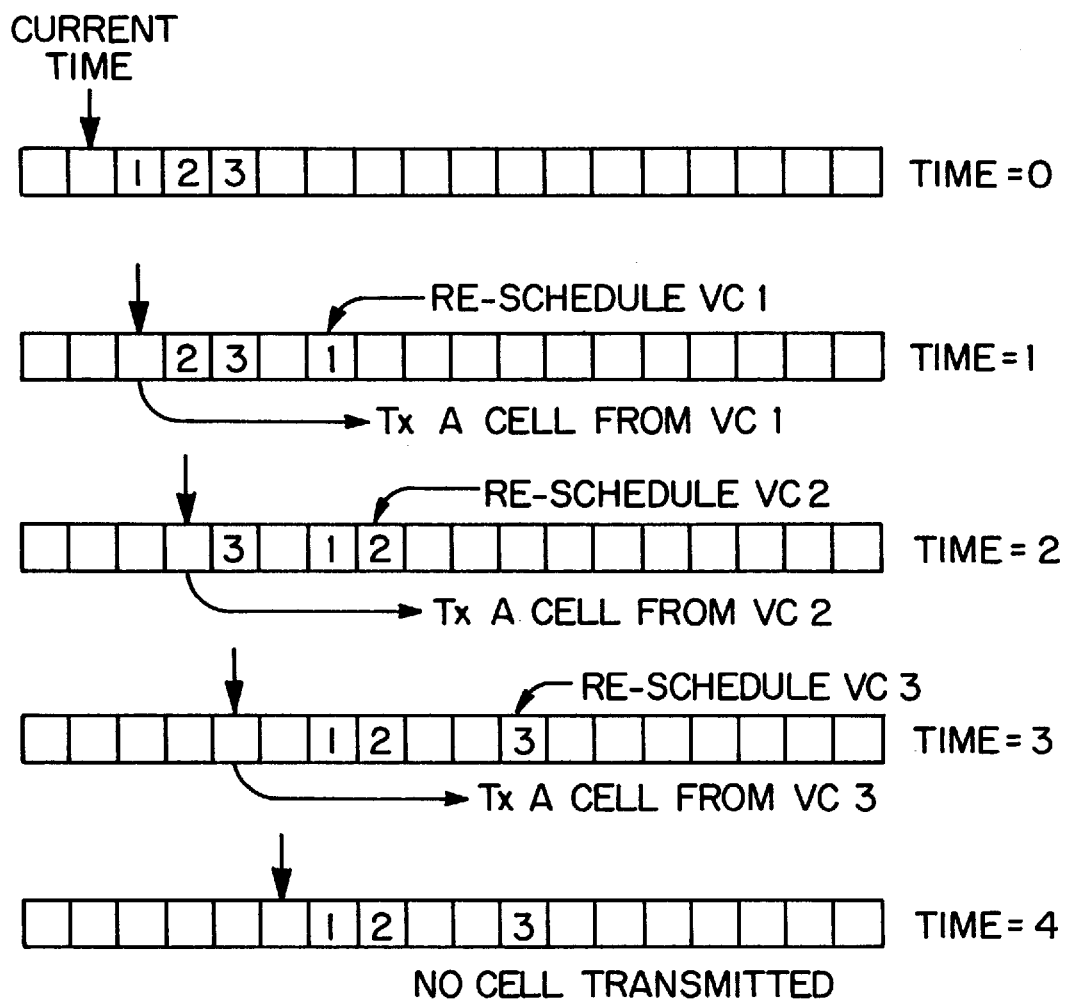
FIG. 1 represents a simple calendar operation for connection scheduling.

The basic concept of calendar-based scheduling is illustrated in FIG. 1. Calendar scheduling is used in ATM applications to decide when to transmit a cell from a given connection. This scheduling is directly applicable to a shaping function. Time is generally referenced in cell times where one cell time is the time from when the first bit of one cell passes a reference point until the time when the first bit of the next cell passes the reference point. As an example, one cell time on an OC3 link is about 2.83 us. Each time the calendar current time is advanced, this is called a "tick". As the current time moves forward, based on some generated or provided timing reference, the current time will pass a connection's scheduled transmit time. These are virtual connections (VC) in FIG. 1. When the current time passes a VC's scheduled time, then a cell from that VC will be transmitted, or placed in a transmit queue, and that VC will be rescheduled on the calendar for a later time. In FIG. 1 virtual channels (VC1 and VC2) are transmitting at the same speed while VC3 is at a slower data rate. Thus, as shown in FIG. 1, when the current time advances by a "tick" a cell is transmitted from each VC and that VC is rescheduled for a later time slot in the calendar.

If a scheduling device is scheduling for several output ports, then a calendar will exist for each port. It is within the scope of the present invention to have a physical calendar for each port or a system which uses a single calendar to emulate the operation of multiple calendars. For each of the calendars, the cell time may be different because the data rate of each port may be different.

The difference in cell times means that the current time marker/indicator for each calendar will be moved forward at a different rate. For example the data rate of ATM cells on an OC3 link is 149.76 Mb/s which means that one cell time is 2.83 us. On a DS3 link (Direct Mapped), the data rate is 44.21 Mb/s which means that one cell time is 9.59 us. Consequently, a calendar that services an OC3 link would step the current time marker forward once every 2.83 us while a calendar that services a DS3 link (Direct Mapped) would step the current time marker forward once every 9.59 us.

The present invention provides two separate embodiments relating to systems and methods for using a single time source to schedule traffic onto multiple ports wherein the data rate of each port is different.

Figure 2:
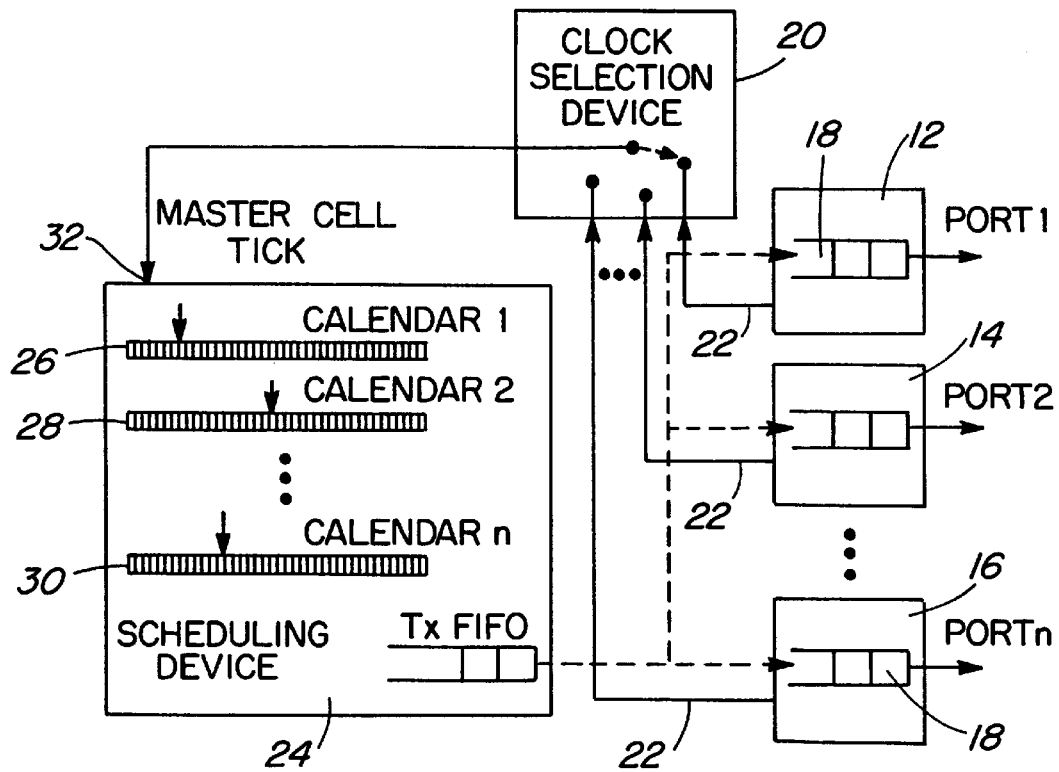
FIG. 2 is a block diagram showing a single timing reference according to a first aspect of the invention.

The first embodiment is shown in a block diagram of FIG. 2. As shown a plurality of output ports, 12, 14, 16, are shown and further identified as port 1, port 2 and port n. Each port includes a FIFO 18 for queuing and transmitting data traffic according to the data rate of the particular port. Each port continuously monitors the data rate of the data being transmitted therefrom and this data rate information is provided to Clock Selection Device 20 via lines 22. Clock Selection Device 20 monitors each of the data rates and selects the fastest rate to provide a master clock pulse to Data Scheduling Device 24. As shown in FIG. 2 Scheduling Device 24 includes calendars 26, 28 and 30 wherein each calendar shapes data traffic for port 1, port 2 and port n respectively.

For every clock event received by the Scheduling Device 24 a decision must be made for each calendar as to whether that calendar should be "ticked" or advanced. To decide whether to advance each of the calendars a counter, an increment device, and a threshold device are used. Each calendar has the following values associated with it:
1) Counter,
2) Tick_Increment,
3) No_Tick_Threshold.

The Counter is initialized to zero and the other two parameters are initialized to specific values that are calculated based on the port speed associated with the calendar and also on the port speed of the fastest port. This is necessary since the fastest port provides the Master Cell Tick 32.

Whenever a Master Cell Tick occurs each calendar will add Tick_Increment to the Counter. As long as the Counter is less than the No_Tick_Threshold then the calendar is ticked and a cell is sent to the port associated with the Counter. When the Counter is greater than or equal to the No_Tick Threshold then the value of Counter is decremented by the value of No_Tick_Threshold and the calendar is not ticked.

The following is a pseudo-code that illustrates the algorithm described above:

```
Service_Tick_Begin:
    for each calendar
        Counter = Counter + Tick_Increment
        if Counter >= No_Tick_Threshold
            Counter = Counter - No_Tick_Threshold
        else
            tick the calendar & send a cell
        endif
    next
Service_Tick_End
```

For the calendar that is servicing the fastest port, Tick_Increment will be zero and No_Tick_Threshold will be set to one. These values will ensure that the calendar is ticked for every Master Cell Tick.

For all the other calendars which are servicing ports that are slower than the reference provided by Master Cell Tick, values for Tick_Increment and No_Tick_Threshold must be chosen in a manner that ensures that the calendar is occasionally not ticked when a Master Cell Tick occurs. Thus, for every Master Cell Tick, one calendar (the fastest port) will tick but all the other calendars will go through a cycle that looks like: tick-tick-tick-tick-no tick-tick-tick-tick-tick-no tick. This occasional "no tick" has the effect of lowering the effective rate at which the calendar is being ticked.

Given the port rate for the fastest port and the rate of the port that a particular calendar is servicing, appropriate values for Tick_Increment and No_Tick_Threshold can be chosen so that the effective cell rate out of the calendar scheduling is equal to the cell rate of that port. The values used for all the calendar parameters should be in a representation that supports fractional values for better accuracy. FIFOs at each port are required to absorb the bursty nature of the calendar servicing created by this method.

In this manner, all calendars (that may service ports with different rates) can be effectively ticked at their appropriate rate using only the single timing input called Master Cell Tick. A given calendar will be ticked several times at the fastest rate, and then pause for a tick, and then tick again at the fastest rate, and then pause for a tick, and so on.

Figure 3:
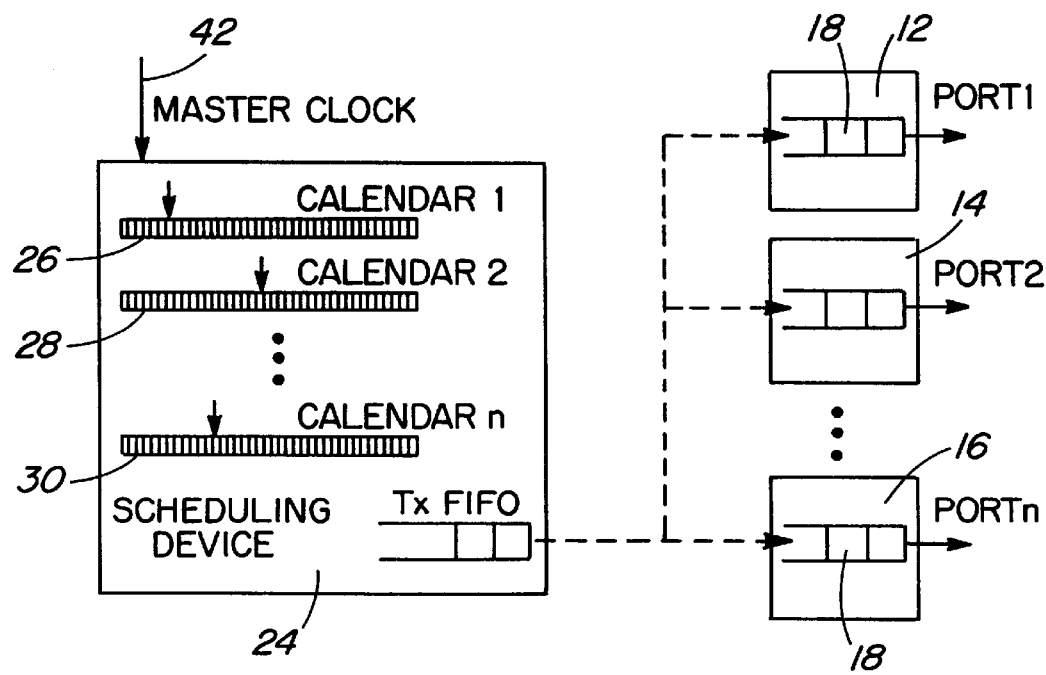
FIG. 3 is a block diagram of a timing reference input according to a second embodiment.

The second embodiment of the present invention is shown in FIG. 3. In this embodiment the same output ports 12, 14 and 16 and FIFO 18 are illustrated. In this embodiment, however, the Clock Selection Device is not used but rather a Master Clock 42 which is 'n' times faster than the cell rate of the fastest output port is provided to scheduling device 24. In a preferred embodiment the value of n is 10 or more. As an example, if the fastest cell rate is 100,000 cells per second, then the Master Clock Rate would be 1 Mhz or 1,000,000 clocks per second.

The Master Clock is used to decide when to tick (and thus send a cell) each of the calendars managed by the scheduling device. In essence, each calendar will be scheduled by using the Master Clock and two per-calendar parameters. A counter that may be called Global Time is incremented by one for each Master Clock event. Thus, Global Time will continually increment at a rate at least 10 times faster than the cell rate of the fastest port.

Each calendar has the following values associated with it:
1) Increment,
2) Next_Tick_Time.

The Global Counter is initialized to zero and Next_Tick_Time for each calendar is set equal to its calendar Increment.

For every Master Clock event, the Global Time value will increase. Each calendar will then compare its Next_Tick_Time to the Global Time. If the Global Time has passed the Next_Tick_Time, then that particular calendar must be ticked. The Next_Tick_Time will then be incremented by the Increment, which essentially schedules the calendar again for some time in the future. The Increment for each calendar is chosen based on the rate of the Master Clock and the rate of the port that the calendar services. Each calendar Increment can be chosen so that the calendar is ticked at the cell rate of the port.

Here is some pseudo-code that illustrates the algorithm described above:

```
Service_Master_Clock_Event_Begin:
    Global_Time = GlobalTime + 1
    for each calendar
        if Global_Time >= Next_Tick_Time
            tick the calendar & send a cell
            Next_Tick_Time = Next_Tick_Time + Increment
        endif
    next
Service_Master_Clock_Event_End
```

With this method, all the calendars servicing ports with different data rates can be ticked at their appropriate cell rate, using only the single input timing reference.

While particular embodiments of the invention have been described and illustrated it will be apparent to one skilled in the art that still other variations to the basic concept can be implemented. It is to be understood that such variations will also fall within the scope of the invention as defined by the appended claims.

We claim:

1. In a data traffic management system having a plurality of output ports for servicing data traffic of different data rates and a scheduling device having a plurality of data calendars for shaping data traffic destined for each of said output ports, a single timing reference to schedule transmission of data to appropriate output ports comprising:

timing means to generate a clock pulse based on the data rate of the output port having the fastest data rate;

counter means to continually count the clock pulses following an initialization event;

increment means to dynamically compare the accumulated number of clock pulses with predetermined increments for each calendar based on the data rate assigned thereto; and threshold means responsive to inputs from said increment means to control transmission of data traffic from each of said calendars.

2. A timing reference as defined in claim 1 wherein said clock pulse is equal to the data rate of the data traffic of the output port having the fastest data rate.

3. A timing reference as defined in claim 2 wherein said threshold means controls said calendar means to prevent transmission of data traffic in response to an input from said increment means.

4. A timing reference as defined in claim 1 further comprising a first-in first-out buffer between said calendars and said output ports.

5. A timing reference as defined in claim 1 wherein an input from said increment means causes said counter means to be re-initialized.

6. A timing reference as defined in claim 1 wherein said clock pulse is n times faster than the data rate of the output port having the fastest data rate.

7. A timing reference as defined in claim 6 wherein said threshold means controls said calendar means to transmit data traffic in response to an input from said increment means.

8. A timing reference as defined in claim 7 wherein said clock pulse is at least 10 times faster than the data rate of the fastest output port.

9. A method of providing a timing reference to a data traffic management system, the system having a plurality of output ports each configured to transmit data at a different data rate and a scheduling system having a calendar for shaping data traffic for delivery to each of said output ports, the method comprising:

continually generating a clock pulse based on the data rate of the output port having the fastest data rate;

counting the accumulated clock pulses following an initialization event;

dynamically comparing the accumulated clock pulses with predetermined increment values for each calendar based on an assigned data rate for each calendar; and controlling transmission of data from said calendars to appropriate output ports in response to the accumulated clock generated by threshold means when the accumulated clock pulses and increment value reaching a threshold respecting each calendar.

10. A method as defined in claim 9 wherein the clock pulse equals the fastest data rate and the data transmitted from the output ports is controlled such that no data is transmitted in response to an input signal.

11. A method as defined in claim 9 wherein the clock pulse rate is 'n' times faster than the fastest data rate and the data transmitted from the output port is controlled such that data is transmitted in response to an input signal.

12. A method as defined in claim 11 wherein 'n' is at least 10.

* * * * *